US012417861B2

(12) United States Patent
Schemmel et al.

(10) Patent No.: US 12,417,861 B2
(45) Date of Patent: Sep. 16, 2025

(54) INSULATING SYSTEM MADE OF SOLID INSULATING MATERIAL AND IMPREGNATING RESIN

(71) Applicants: SIEMENS AKTIENGESELLSCHAFT, Munich (DE); SIEMENS MOBILITY GMBH, Munich (DE)

(72) Inventors: Florian Schemmel, Nuremberg (DE); Steffen Lang, Hallerndorf (DE); Manfred Ochsenkühn, Berg (DE); Niels Müller, Georgensgmünd (DE); Marek Maleika, Fürth (DE)

(73) Assignee: Siemens Aktiengesellschaft, Munich (DE)

(*) Notice: Subject to any disclaimer, the term of this patent is extended or adjusted under 35 U.S.C. 154(b) by 27 days.

(21) Appl. No.: 18/016,342

(22) PCT Filed: Jul. 7, 2021

(86) PCT No.: PCT/EP2021/068820
§ 371 (c)(1),
(2) Date: Jan. 14, 2023

(87) PCT Pub. No.: WO2022/013036
PCT Pub. Date: Jan. 20, 2022

(65) Prior Publication Data

US 2023/0274852 A1 Aug. 31, 2023

(30) Foreign Application Priority Data

Jul. 14, 2020 (DE) ..................... 10 2020 208 760.1

(51) Int. Cl.

| | |
|---|---|
| ***H01B 17/56*** | (2006.01) |
| ***H01B 3/42*** | (2006.01) |
| ***H01B 3/46*** | (2006.01) |

(52) U.S. Cl.
CPC ............... *H01B 3/427* (2013.01); *H01B 3/46* (2013.01); *H01B 17/56* (2013.01)

(58) Field of Classification Search
CPC ........ H01B 17/56; H01B 3/306; H01B 3/308; H01B 3/40; H01B 3/427; H01B 3/46; H01B 3/42

(Continued)

(56) References Cited

U.S. PATENT DOCUMENTS

| | | | | |
|---|---|---|---|---|
| 5,470,622 A | | 11/1995 | Rinde et al. | |
| 5,528,444 A | * | 6/1996 | Cooke .................. | B60L 3/0069 361/115 |

(Continued)

FOREIGN PATENT DOCUMENTS

| | | | | |
|---|---|---|---|---|
| CN | 106497475 B | * | 7/2020 | ............. C09J 11/04 |
| EP | 0356928 A1 | | 3/1990 | |

(Continued)

OTHER PUBLICATIONS

PCT International Search Report and Written Opinion of International Searching Authority mailed Oct. 28, 2021 corresponding to PCT International Application No. PCT/EP2021/068820.

*Primary Examiner* — Timothy J Thompson
*Assistant Examiner* — Guillermo J Egoavil
(74) *Attorney, Agent, or Firm* — Lempia Summerfield Katz LLC

(57) ABSTRACT

The invention relates generally to the field of insulating electrical conductors against partial discharge in the medium- and high-voltage ranges. In particular, the invention relates to an insulating system for an electric machine, in particular a rotating electric machine such as an electric motor and/or a generator. The invention provides for the first time a substitute for the conventionally used mica as a barrier material in an insulating system, such as the main (Continued)

insulation of rotating electric machines such as motors and/or generators. The substitute is based on a polyetherimide/siloxane copolymer, which can be processed two-dimensionally, for example by surface extrusion. In this way, sheets are produced and, after being processed in sheet form or as a laminate, can be used as planar insulating materials, or cut as strips, in insulating systems.

14 Claims, 2 Drawing Sheets

(58) Field of Classification Search
USPC ........................................................ 174/110 R
See application file for complete search history.

(56) References Cited

U.S. PATENT DOCUMENTS

| | | | | | |
|---|---|---|---|---|---|
| 5,552,222 | A | | 9/1996 | Bolon et al. | |
| 5,801,334 | A | * | 9/1998 | Theodorides | H02K 3/40 174/120 SR |
| 6,155,212 | A | * | 12/2000 | McAlister | F02M 27/02 123/3 |
| 6,847,187 | B2 | * | 1/2005 | Kumar | H02H 7/0852 361/37 |
| 7,732,966 | B2 | * | 6/2010 | Sivasubramaniam | H02K 55/06 310/178 |
| 7,839,049 | B2 | * | 11/2010 | Jansen | H02K 1/14 310/194 |
| 9,356,551 | B2 | * | 5/2016 | Berry | H02P 29/60 |
| 9,860,987 | B2 | * | 1/2018 | Singh | H05K 1/111 |
| 10,014,735 | B2 | * | 7/2018 | Ma | F16J 15/54 |
| 10,249,409 | B2 | * | 4/2019 | Yun | H01B 1/026 |
| 11,541,526 | B2 | * | 1/2023 | Mucsi | H02K 11/33 |
| 11,742,108 | B1 | * | 8/2023 | Naber | H01B 7/02 174/110 R |
| 11,840,148 | B2 | * | 12/2023 | Loder | B60L 50/62 |
| 2010/0147548 | A1 | * | 6/2010 | Bhandari | H01B 13/14 174/110 SR |
| 2015/0361245 | A1 | | 12/2015 | Brockschmidt et al. | |
| 2018/0051173 | A1 | | 2/2018 | Sheth et al. | |

FOREIGN PATENT DOCUMENTS

| | | | | | |
|---|---|---|---|---|---|
| EP | 0699336 | A1 | | 3/1996 | |
| EP | 2763142 | A1 | | 8/2014 | |
| JP | H11135236 | A | * | 5/1999 | B32B 7/02 |
| RU | 2510119 | C2 | * | 3/2014 | H02K 15/12 |
| WO | 2011082149 | A1 | | 7/2011 | |
| WO | 2020095268 | A1 | | 5/2020 | |

* cited by examiner

INSULATING SYSTEM MADE OF SOLID INSULATING MATERIAL AND IMPREGNATING RESIN

This application is the National Stage of International Application No. PCT/EP2021/068820, filed Jul. 7, 2021, which claims the benefit of German Patent Application No. DE 10 2020 208 760.1, filed Jul. 14, 2020. The entire contents of the documents are hereby incorporated herein by reference.

BACKGROUND

The present embodiments relate to the field of insulation of electrical conductors against partial discharge in the medium- and high-voltage range. In particular, the present embodiments relate to an insulation system for an electric machine, such as a rotating electric machine such as an electric motor and/or a generator.

Electric machines, such as, for example, motors and generators in the medium- and high-voltage range, include electrical conductors, a main insulation and a laminated stator core. The main insulation serves the purpose of electrically insulating the conductors with respect to one another, with respect to the laminated stator core, and with respect to the environment. When the electric machine is in operation, electrical partial discharges may result in the formation of “treeing” channels in the main insulation. As a consequence of the “treeing” channels, electrical breakdown through the main insulation may occur. In the low-voltage range, where wires and cables are used, electrical discharges do not necessarily occur during operation, providing that no barriers against partial discharges are required in that case.

In the present case, “medium- and high-voltage range” may be electrical energy technology that operates with a high voltage in the range above 700 V, up to and including 52 kV. This also encompasses insulation systems that are of interest for rapidly chargeable drive systems in the automotive industry.

A barrier in the form of a surface insulation material against partial discharges has to date been achieved mainly by the use of mica in the main insulation, the mica having a high partial discharge resistance. The mica is processed in the form of platelet-shaped mica particles with a conventional particle size of several hundred micrometers to several millimeters into a mica paper, which is then placed onto and adhesively bonded to a carrier, such as a glass fiber weave and/or insulation film, so that the mica particles produce the surface insulation material in the form of a mica short grain. A mica tape is cut from this mica short grain and is wrapped around the conductor to produce the main insulation. Subsequently, to produce the insulation system, the electrical insulation mica wrapping tape is impregnated with a liquid synthetic resin and the synthetic resin is then cured.

Known are insulation systems, such as for example the system known under the brand “Micalastic®”, in which the main insulation, including a mica wrapping tape as surface insulation material, is impregnated with a bisphenol epoxy resin in a vacuum pressure impregnation process.

Micalastic® is also known from EP2763142A1 and DE 102011083228A.

In order to improve the partial discharge resistance of the main insulation, it is known to use nanoscale particles that are dispersed in the synthetic resin prior to the impregnation. However, the presence of the particles results in a reduction in the pot life of the synthetic resin, which manifests, for example, in a progressive polymerization of the synthetic resin prior to impregnation.

The production of the surface insulation material in the form of a mica short grain and/or a mica tape is complex and expensive.

For example, on account of the requirements, mica-containing laminates including, for example, m-aramid and polyimide as carrier film have been hitherto used for traction motors for slot linings as well. Mica is a natural product and is mined in the form of mica schist. Accordingly, resources are limited, the mica is subject to fluctuations in quality depending on the mining location, is not always readily available, and sourcing is associated with considerable costs, not to mention the complex processing for producing the mica tape as surface insulation material.

SUMMARY AND DESCRIPTION

The scope of the present invention is defined soley by the appended claims and is not affected to any degree by the statements within this summary.

The present embodiments may obviate one or more of the drawbacks or limitations in the related art. For example, a surface insulation material for the complete or partial replacement of the known mica paper-containing insulation materials for use in the production of an insulation system (e.g, of the insulation system constituting the main insulation of an electric rotating machine such as a motor or a generator in the medium- and high-voltage range) is provided.

The subject matter of the present embodiments includes, for example, an insulation system including a solid insulation material in the form of a surface insulation material and a synthetic resin. The surface insulation material is a copolymer of a polyetherimide with a siloxane and the synthetic resin is a thermoset with which the surface insulation material is impregnated and subsequently cured in the form of an encapsulation.

The general finding of the present embodiments is that in polyetherimide-siloxane copolymers, there has been identified and demonstrated an enormous potential as an insulation material in the medium- and high-voltage range with respect to resistance against partial discharges. For example, it has also been found that the copolymers of polyetherimide and siloxane, as a result of the less polar side groups of the siloxane with respect to the pure polyetherimide, act as “impurity.” As a result of this, the glass transition temperature falls. In addition, the siloxane content acts as a “plasticizer,” which is, however, chemically bound and cannot thermally withstand such high temperatures as the pure polyetherimide, but which is nevertheless suitable for relatively high temperature stresses. Polyetherimide-siloxane copolymers may be produced by suitable extrusion processes in sheetlike form as a film that, for its part, has sufficient elasticity to be used, in cut form, as wrapping tapes for wrapping tape main insulations.

The partial discharge resistance is evaluated via a surface profilometer by determining the specific erosion volume after electrical ageing. This is performed using the method of IEC 60343. The test structure and test conditions may be found in the publication: N. Müller; S. Lang; R. Moos: “Influence of ambient conditions on electrical partial discharge resistance of epoxy anhydride based polymers using IEC 60343 method,” Transactions on Dielectrics and Electrical Insulation 2019.

In an embodiment, the polyetherimide-siloxane copolymer is a block copolymer.

The content of siloxane in the copolymer is in the range from, for example, 0.1% by weight to 90% by weight, 10% by weight to 60% by weight, or 20% by weight to 40% by weight, based on the total weight of the copolymer.

In an embodiment, the atomic proportion of silicon atoms in the copolymer is in the range from 1% to 25%, or 5% to 15%.

In an embodiment, the polyetherimide-siloxane copolymer is a block copolymer of general formula (I)

The impregnation resin used is a thermoset. For example, polyester, formaldehyde, epoxide, novolak, silicone, polyesterimide, polyurethane, and any mixtures, blends, and copolymers of the aforementioned compounds may be used. Impregnation resins for slot linings and/or wrapping tape insulations are generally known, for example, from the patent specifications mentioned above. The solid insulation materials are impregnated with these impregnation resins, and the resin is then cured in order to complete the insulation system.

(I)

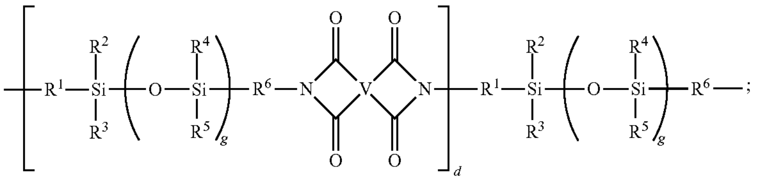

in which $R^{1-6}$ are identical or different and are selected from the group of:
- substituted or unsubstituted, saturated, unsaturated or aromatic monocycles having 5 to 30 carbon atoms;
- substituted or unsubstituted, saturated, unsaturated, or aromatic polycycles having 5 to 30 carbon atoms;
- substituted or unsubstituted, saturated hydrocarbons having 1 to 30 carbon atoms;
- substituted or unsubstituted, unsaturated hydrocarbons having 2 to 30 carbon atoms.

V is a tetravalent linker group selected from the group of:
- substituted or unsubstituted, saturated, unsaturated, or aromatic monocycles and polycycles having 5 to 50 carbon atoms;
- substituted or unsubstituted, saturated hydrocarbons having 1 to 30 carbon atoms;
- substituted or unsubstituted, unsaturated hydrocarbons having 2 to 30 carbon atoms;
- and also any combinations of linker groups including at least one of the aforementioned groups, g is 1 to 30, and d is 2 to 20.

In a further embodiment, the copolymer may include one or more additives. By way of example, one or more metal oxides, such as, for example, $TiO_2$, $Fe_2O_3$, and/or $MnFe_2O_4$, and/or electrically nonconductive carbon-based fillers, such as, for example, industrial carbon black, may be used as additives.

The term "siloxane" may be a compound having at least one —Si—O—Si— unit, (e.g., those that form in the polymer an —Si—O—Si— backbone as is common in silicones). For example, a polydialkylsiloxane, such as polydimethylsiloxane, or polydiarylsiloxane, such as polydiphenylsiloxane, are simple forms of a siloxane. There are also mixed forms of siloxanes, such as, for example, a polyarylalkylsiloxane.

The term polyetherimide or "PEI" refers to a thermoplastic that is versatile in use since it is resistant to high temperatures and is classified as flame retardant, since it exhibits low smoke evolution even if it does still burn. PEI has a high strength and also high electrical breakdown resistance, low weight, and is resistant to UV light and gamma rays. PEI is commercially available, for example, as "ULTEM®".

A polyetherimide-siloxane copolymer is available under the trade name "Siltem™", and has already been successfully used and tested. Siltem is an amorphous thermoplastic polyetherimide-siloxane copolymer and combines the temperature resistance of PEI with the flexibility of a silicone elastomer.

DETAILED DESCRIPTION

Figure 1:
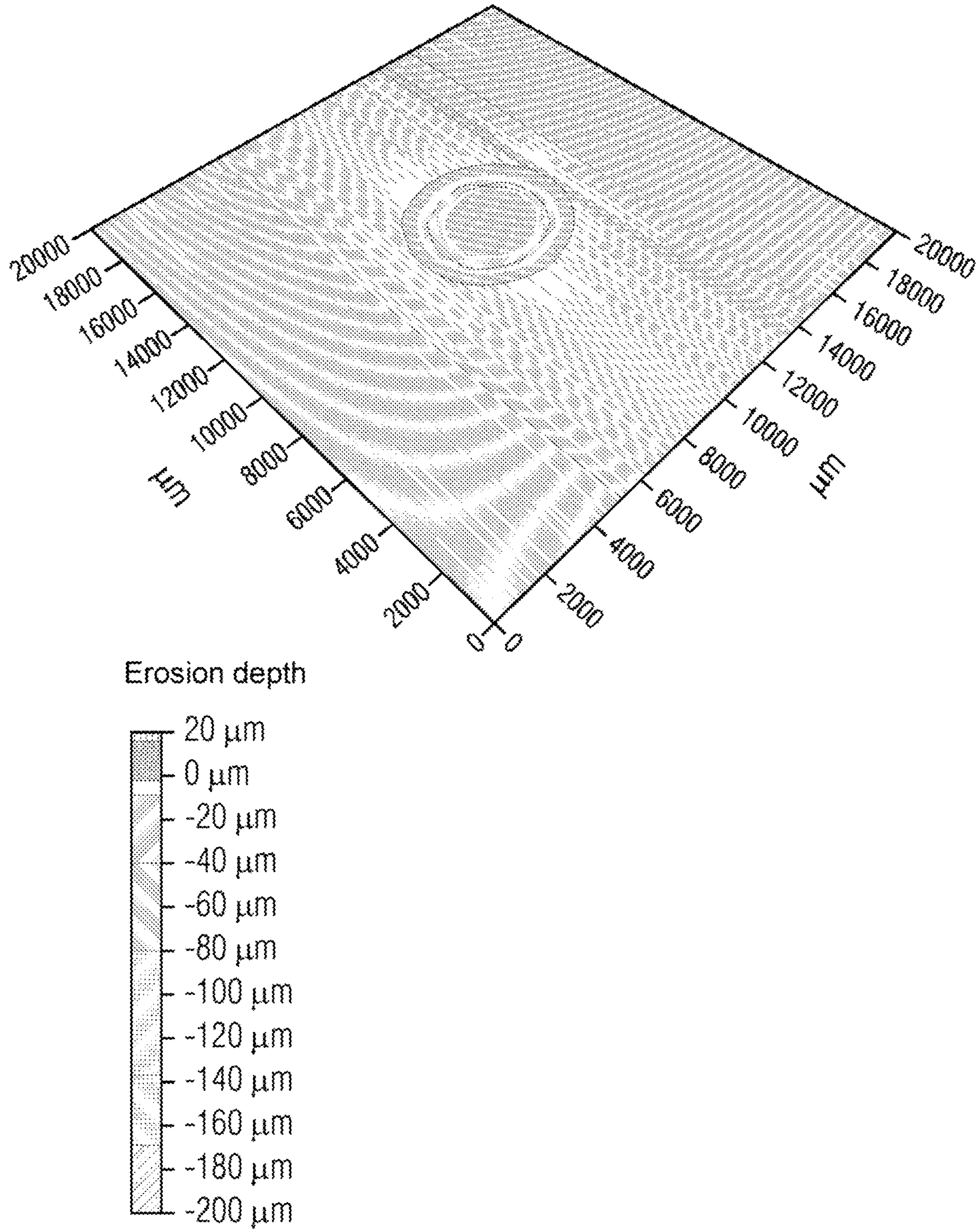
FIGS. 1 and 2 show the surface of two test specimens including insulation systems, in each case illustrating a solid surface insulation material impregnated with a synthetic resin that has been cured after performing impregnation.
Figure 2:
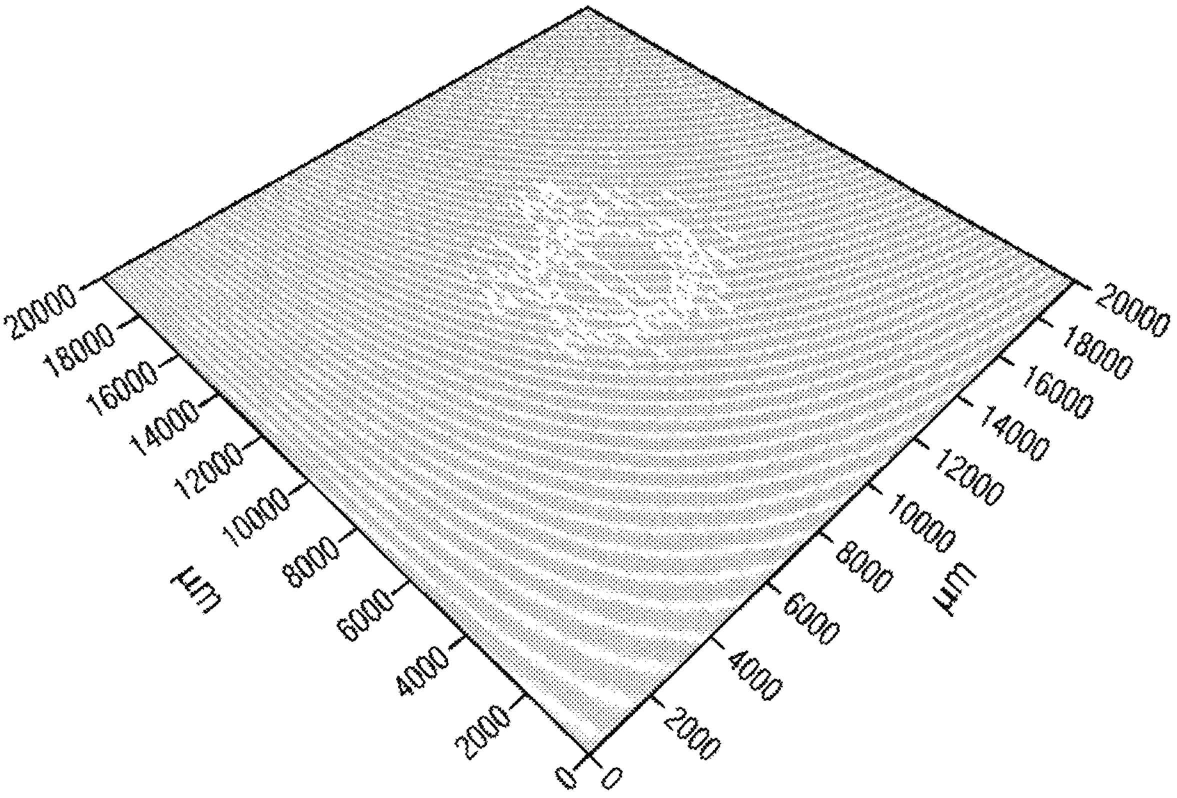

FIG. 1 and FIG. 2 both show a test specimen after electrical ageing. FIG. 1 illustrates erosion of an insulation system produced with pure polyetherimide, and FIG. 2 illustrates erosion of the insulation system produced with a polyetherimide-siloxane copolymer of the present embodiments in the form of a solid surface insulation material under the same conditions.

The defined standard test conditions for electrical ageing according to IEC 60343 are:

Voltage of 10 kV; atmosphere of air 50% RH; temperature at room temperature, approximately 23° C.; test duration of 100 hours; and flow rate of 1000 $l*h^{-1}$.

Underneath FIG. 1, there is the key, where it is shown that in FIG. 1, for the insulation system with pure PEI, under the abovementioned conditions, a circle forms around a centrally arranged conductor with an erosion depth, caused by partial discharges, of up to 80 μm; under the same conditions, the test specimen of FIG. 2, with the insulation system that is produced the same except for the solid insulation material and includes the copolymer according to the present embodiments as solid insulation material, in the case tested the commercial product Siltem® and/or Ultem® STM 1600 as PEI-siloxane copolymer, also exhibits a circular ageing, but merely with an erosion depth of between −1 μm and −8 μm.

According to these tests, the present embodiments deliver a quantum leap in insulation technology, since, for example, for the first time, the complex-to-produce and costly mica-containing insulation material may be dispensed with.

It is shown that compared to the pure polyetherimide, the copolymer brings about an enormous increase, a virtually complete resistance to partial discharge.

On account of the ascertained partial discharge resistance, the polyetherimide-siloxane copolymer, provided here for the first time as a mica substitute, is suitable as surface insulation material both for wrapping tape insulations and for sheetlike (e.g., slot lining, insulations, particularly in the use of motors, both for traction and as drive motor, but also for generators such as a wind power generator). The elongation properties broaden the design scope of, for example, traction motors.

It is thus an achievable aim to produce both the m-aramid-containing slot linings and also the polyimide-containing insulation tapes with the surface insulation material of the present embodiments made from polyetherimide-siloxane copolymer, without having to make tradeoffs in terms of the power density of the motors or generators. For example, it is possible in both insulation systems to replace the mica paper and/or mica tape, which each at least include mica on a carrier, such as, for example, glass weave, and a tape adhesive for bonding the mica platelets, with the polyetherimide-siloxane copolymer, which, for example, may be processed by surface extrusion.

A polyetherimide-siloxane film produced, for example, by surface extrusion insulates, for example, the coils and/or the wires of the winding of an electric motor. These coils are then inserted into the slots of a laminated core and then impregnated with an impregnation resin, such as, for example, a polyesterimide and/or a silicone.

An insulation system according to an embodiment, for example, includes laminate with one or more films of polyetherimide-siloxane copolymer, also processed, for example, to give laminates with carriers and/or protective films, bonded, for example, to m-aramid or polyimide as carrier film.

The term “film” is understood in the present case to be a sheetlike layer of a material. The film is a layer and not a layer stack.

In contrast, a “laminate” may be a layer stack including one or more films. The layers may lie on top of one another in a full-surface manner (e.g., all layers are films) or in a partial-surface manner (e.g., at least one layer has a lattice structure and/or randomly distributed fibers and/or grid structure). It may also suffice for laminate formation for a film to be bonded with a weave or a laid scrim (e.g., a glass fiber laid scrim).

In the present case, a “laminate” may be a stack and/or a composite of at least two layers or films, (e.g., at least one carrier and/or protective film, such as made of m-aramid or polyimide, with at least one film made of the polyetherimide-siloxane copolymer).

For example, in the case of slot linings, as are found for example in electric motors, wind generators, etc., single films of polyetherimide-siloxane copolymer as surface insulation material may tear, and therefore, it is better, for example, to use laminates having relatively tear-resistant films for the use of the polyetherimide-siloxane copolymer as insulation.

In a further embodiment, the laminates are, for example, cut into tapes and used in insulation systems.

In this way, an insulation of a slot for an electric motor may be protected in its entire length also and/or additionally by a surface insulation material made of polyetherimide-siloxane copolymer in a large thickness and/or processed as a laminate (e.g., in a composite with m-aramid films and/or polyimide films, as slot lining).

The winding is then inserted into the slots, and the whole winding is impregnated with an impregnation resin such as polyesterimide or silicone.

When producing the surface insulation material as wrapping tape, for example, a tape film is produced for the purpose mentioned here in a thickness in the range from 20 μm to 300 μm, from 25 μm to 200 μm, or from 30 μm to 170 μm. A wrapping tape, for producing the solid portion of a wrapping tape insulation, is then produced from the tape film and is then impregnated with impregnation resin.

When producing the surface insulation material (e.g., for slot lining), for example, a film is produced for the purpose mentioned here in a thickness in the range from 12.5 μm to 500 μm, from 25 μm to 450 μm, or from 50 μm to 300 μm. A surface insulation material is then produced from the film, for example, by laminating a plurality of films, papers, or films of different materials, such as m-aramid films or polyimide films, to produce the solid portion of a slot insulation system, and is then impregnated with impregnation resin.

Further advantages of the use of a polyetherimide-siloxane copolymer as surface insulation material are, for example, that: the entire insulation system may be produced much more favorably than with mica-based surface insulation material; the surface insulation material is thermally resilient from approximately 150° C. to 200° C.; the polyetherimide-siloxane copolymer is also flexible by virtue of its siloxane content, providing that it may be used as wrapping tape;

electrically, it durably withstands, as tests have shown, the required field strengths This is because, as has been found in the present case, if in the case of electric field strengths of up to a maximum of 15 kV/mm, electrical discharges strike a siloxane or an $SiO_2$ nanoparticle, a vitrified protective layer forms that significantly increases the lifetime of an electric rotating machine insulated therewith. The vitrified layer thus formed may be readily detected by SEM, and in addition, elemental analysis by EDX is possible in order to detect the silicon in the copolymer. A further advantage of the use of a polyetherimide-siloxane copolymer as surface insulation material is, for example, that it is partial discharge-resistant, as FIG. 2 of the present description shows, which leads to a marked increase in the electrical lifetime.

As a result of the present embodiments, first, a replacement is provided for the conventionally used mica as barrier material in an insulation system such as the main insulation of electric rotating machines such as motors and/or generators. The replacement is based on a polyetherimide-siloxane copolymer that may be processed in sheet form (e.g., by surface extrusion). Films are produced that are processed in film form or else as laminate, cut as sheetlike insulation materials or as tapes, usable in insulation systems.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An insulation system comprising:

a solid insulation material in the form of a surface insulation material and a synthetic resin, wherein the surface insulation material is a copolymer of a polyetherimide with a siloxane, and the synthetic resin is a thermoset with which the surface insulation material is impregnated and subsequently cured in the form of an encapsulation, and wherein the copolymer comprises an atomic proportion of silicon atoms in the range from 1% to 25%, based on all atoms in the copolymer.

2. The insulation system of claim 1, wherein the copolymer of the polyetherimide and the siloxane is a block copolymer.

3. The insulation system of claim 1, wherein the copolymer has a siloxane content in the range from 0.1% by weight to 90% by weight, based on a total weight of the copolymer.

4. The insulation system of claim 1, wherein the copolymer is according to formula:

5. The insulation system of claim 1, wherein the surface insulation material includes one or more additives.

6. The insulation system of claim 1, wherein the surface insulation material is made from polyetherimide-siloxane copolymer at least in the form of a laminate, a film, a tape, a tape cut from a laminate, or any combination thereof.

7. An apparatus comprising:

an insulation system comprising:

a solid insulation material in the form of a surface insulation material and a synthetic resin, wherein the surface insulation material is a copolymer of a polyetherimide with a siloxane, and the synthetic resin is a thermoset with which the surface insulation material is impregnated and subsequently cured in the form of an encapsulation, and wherein the copolymer comprises an atomic proportion of silicon atoms in the range from 1% to 25%, based on all atoms in the copolymer.

8. The apparatus of claim 7, wherein the surface insulation material is made from polyetherimide-siloxane copolymer at least in the form of a laminate, a film, a tape, a tape cut from a laminate, or any combination thereof.

9. The apparatus of claim 7, wherein the insulation system is in the medium- and high-voltage range.

10. The apparatus of claim 7, wherein the surface insulation material is made from polyetherimide-siloxane copolymer at least in the form of a film, a laminate, or the film and the laminate as slot lining.

(I)

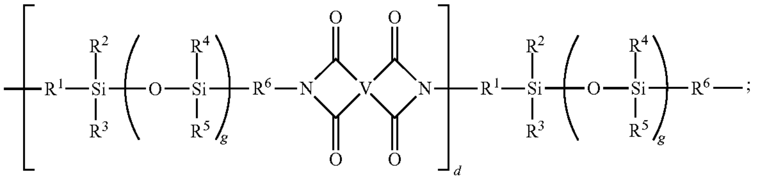

in which:

$R^{1-6}$ are identical or different and are selected from the group comprising:

substituted or unsubstituted, saturated, unsaturated or aromatic monocycles having 5 to 30 carbon atoms;

substituted or unsubstituted, saturated, unsaturated or aromatic polycycles having 5 to 30 carbon atoms;

substituted or unsubstituted, saturated hydrocarbons having 1 to 30 carbon atoms;

substituted or unsubstituted, unsaturated hydrocarbons having 2 to 30 carbon atoms; or any combination thereof, and V is a tetravalent linker group selected from the group comprising:

substituted or unsubstituted, saturated, unsaturated or aromatic monocycles and polycycles having 5 to 50 carbon atoms;

substituted or unsubstituted, saturated hydrocarbons having 1 to 30 carbon atoms;

substituted or unsubstituted, unsaturated hydrocarbons having 2 to 30 carbon atoms; or any combinations of linker groups comprising at least one of the tetravalent linker groups, wherein g is 1 to 30, and wherein d is 2 to 20.

11. The apparatus of claim 7, wherein the surface insulation material is made from polyetherimide-siloxane copolymer at least in the form of a tape, the tape being a wrapping tape.

12. The apparatus of claim 7, wherein the copolymer of the polyetherimide and the siloxane is a block copolymer.

13. The apparatus of claim 7, wherein the copolymer is according to formula:

(I)

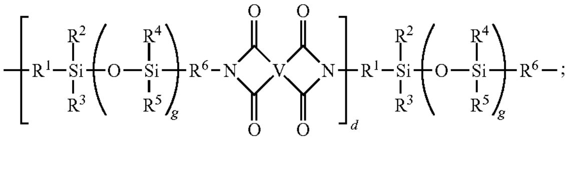

in which:

$R^{1-6}$ are identical or different and are selected from the group comprising:

substituted or unsubstituted, saturated, unsaturated or aromatic monocycles having 5 to 30 carbon atoms;

substituted or unsubstituted, saturated, unsaturated or aromatic polycycles having 5 to 30 carbon atoms;

substituted or unsubstituted, saturated hydrocarbons having 1 to 30 carbon atoms;

substituted or unsubstituted, unsaturated hydrocarbons having 2 to 30 carbon atoms; or any combination thereof, and V is a tetravalent linker group selected from the group comprising:

substituted or unsubstituted, saturated, unsaturated or aromatic monocycles and polycycles having 5 to 50 carbon atoms;

substituted or unsubstituted, saturated hydrocarbons having 1 to 30 carbon atoms;

substituted or unsubstituted, unsaturated hydrocarbons having 2 to 30 carbon atoms; or any combinations of linker groups comprising at least one of the tetravalent linker groups, wherein g is 1 to 30, and wherein d is 2 to 20.

14. The apparatus of claim 7, wherein the surface insulation material includes one or more additives.

* * * * *